(12) United States Patent
Numata

(10) Patent No.: US 11,399,126 B2
(45) Date of Patent: Jul. 26, 2022

(54) IMAGING APPARATUS AND MONITORING SYSTEM FOR PERFORMING A FOCUS CONTROL AND AN ANGLE CONTROL

(71) Applicant: CANON KABUSHIKI KAISHA, Tokyo (JP)

(72) Inventor: Aihiko Numata, Inagi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/663,921

(22) Filed: Oct. 25, 2019

(65) Prior Publication Data
US 2020/0137293 A1 Apr. 30, 2020

(30) Foreign Application Priority Data
Oct. 26, 2018 (JP) .............................. JP2018-201739

(51) Int. Cl.
| | | |
|---|---|---|
| *H04N 5/232* | (2006.01) | |
| *G03B 13/32* | (2021.01) | |
| *G02B 7/36* | (2021.01) | |
| *H04N 5/225* | (2006.01) | |
| *H04N 5/369* | (2011.01) | |

(52) U.S. Cl.
CPC ......... *H04N 5/23212* (2013.01); *G03B 13/32* (2013.01); *G02B 7/36* (2013.01); *H04N 5/2253* (2013.01); *H04N 5/369* (2013.01)

(58) Field of Classification Search
CPC .. H04N 5/23212; H04N 5/2253; H04N 5/369; H04N 5/232123; H04N 5/2259;
(Continued)

(56) References Cited

U.S. PATENT DOCUMENTS 9,584,730 B2 * 2/2017 Costigan .............. H04N 5/2252
10,142,546 B2 * 11/2018 Ito ...................... H04N 5/23212
(Continued)

FOREIGN PATENT DOCUMENTS

| CN | 103080829 A | 5/2013 |
|---|---|---|
| CN | 103246131 A | 8/2013 |

(Continued)

OTHER PUBLICATIONS

Nomoto et al., "A 4 M-Pixel CMD Image Sensor with Block and Skip Access Capability," Imagining Circuits and Systems, Session 11, IEEE, ISSCC97, Feb. 7, 1997, pp. 186-453.
(Continued)

*Primary Examiner* — Luong T Nguyen
(74) *Attorney, Agent, or Firm* — Carter, DeLuca & Farrell LLP

(57) ABSTRACT

An imaging apparatus includes a focus controller, an image sensor, an angle controller configured to change an angle of an imaging plane of the image sensor, an evaluation value acquirer configured to acquire a contrast evaluation value in a first evaluation area of the image sensor during a focus control, and to acquire a contrast evaluation value in a second evaluation area different from the first evaluation area during an angle control, and an exposure controller configured to control an exposure condition of the image sensor. The exposure controller determines a first exposure condition so as to provide a correct exposure value to the first evaluation area during the focus control, and determines a second exposure condition different from the first exposure so as to provide a correct exposure value to the second evaluation area during the angle control.

12 Claims, 13 Drawing Sheets

(58) Field of Classification Search
CPC .......... H04N 5/232127; H04N 5/2351; H04N 5/2353; G03B 13/32; G02B 7/36
See application file for complete search history.

(56) References Cited

U.S. PATENT DOCUMENTS

| | | | |
|---|---|---|---|
| 2016/0261891 A1* | 9/2016 | Choi | H04N 19/176 |
| 2017/0192247 A1* | 7/2017 | Okuda | G03B 5/06 |
| 2017/0272658 A1* | 9/2017 | Ito | G02B 7/38 |
| 2020/0033701 A1 | 1/2020 | Numata | |
| 2020/0098148 A1 | 3/2020 | Numata | |

FOREIGN PATENT DOCUMENTS

| | | |
|---|---|---|
| CN | 103984199 A | 8/2014 |
| CN | 105721861 A | 6/2016 |
| CN | 107437050 A | 12/2017 |
| CN | 107667520 A | 2/2018 |
| DE | 4226892 A1 | 2/1994 |
| EP | 2490439 A1 | 8/2012 |
| JP | 2008-035308 * | 2/2008 |
| JP | 2008035308 A | 2/2008 |
| JP | 2017173802 A | 9/2017 |

OTHER PUBLICATIONS

Extended European Search Report issued by the European Patent Office dated Mar. 23, 2020 in corresponding European Patent Application No. 19205284.3.
Notification of the First Office Action issued by the China National Intellectual Property Administration dated May 26, 2021 in corresponding CN Patent Application No. 201911021500.2, with English translation.

* cited by examiner

IMAGING APPARATUS AND MONITORING SYSTEM FOR PERFORMING A FOCUS CONTROL AND AN ANGLE CONTROL

BACKGROUND OF THE INVENTION

Field of the Invention

The present invention relates to an imaging apparatus and a monitoring system.

Description of the Related Art

Japanese Patent Laid-Open No. ("JP") 2017-173802 discloses an imaging apparatus that can provide so-called tilt imaging that tilts an optical axis of a lens relative to an image sensor in order to maintain long the depth of field even at a telephoto end with a bright F-number lens for an object surface tilting to the optical axis of the imaging apparatus.

However, when the direction of the imaging apparatus is changed or the zoom state of the lens is changed in tilt imaging using the imaging apparatus disclosed in JP 2017-173802, a positional relationship between the object surface and a focal plane shifts.

Accordingly, when the positional relationship between the object surface and the focal plane shifts, JP 2017-173802 discloses an adjustment using the following method so that the object surface can correspond to the focal plane. First, this method acquires a contrast evaluation value at the center of the image or the entire image while driving a focus lens, and moves the focus lens to a position that provides the highest contrast evaluation value. Next, this method changes the tilt angle, acquires the contrast evaluation values at both ends of the image in a direction parallel to the tilt direction, and changes the tilt angle to a position that provides the highest contrast evaluation value. Thereafter, this method sequentially repeats the focus lens drive (focus control) and the tilt angle adjustment (angle control) until the target accuracy is achieved. Hence, the method disclosed in JP 2017-173802 needs a long time for the focus control and the angle control.

SUMMARY OF THE INVENTION

The present invention provides an imaging apparatus and a monitoring system, each of which can quickly complete a focus control and an angle control.

An imaging apparatus according to one aspect of the present invention includes a focus controller configured to control a focus position of an imaging optical system, an image sensor, an angle controller configured to change an angle formed between a plane orthogonal to an optical axis of the imaging optical system and an imaging plane of the image sensor, an evaluation value acquirer configured to acquire a contrast evaluation value in a first evaluation area of the image sensor during a focus control, and to acquire a contrast evaluation value in a second evaluation area different from the first evaluation area during an angle control, and an exposure controller configured to control an exposure condition of the image sensor. The exposure controller determines a first exposure condition so as to provide a correct exposure value to the first evaluation area during the focus control, and determines a second exposure condition different from the first exposure so as to provide a correct exposure value to the second evaluation area during the angle control.

An imaging apparatus according to another aspect of the present invention includes an imaging optical system, a focus controller configured to control a focus position of the imaging optical system, an image sensor configured to photoelectrically convert an optical image formed through the imaging optical system, an angle controller configured to change an angle formed between a principal surface of the imaging optical system and the imaging plane of the image sensor, an evaluation value acquirer configured to acquire a contrast evaluation value in a first evaluation area during a focus control and to acquire a contrast evaluation value in a second evaluation area different from the first evaluation area during an angle control, and an exposure controller configured to control a read operation for reading a pixel signal from the image sensor. The exposure controller reads the pixel signal in a first read operation during the focus control, and reads the pixel signal in a second read operation different from the first read operation during the angle control.

A monitoring system including the above imaging apparatus also constitutes another aspect of the present invention.

Further features of the present invention will become apparent from the following description of exemplary embodiments with reference to the attached drawings.

DESCRIPTION OF THE EMBODIMENTS

Figure 1:
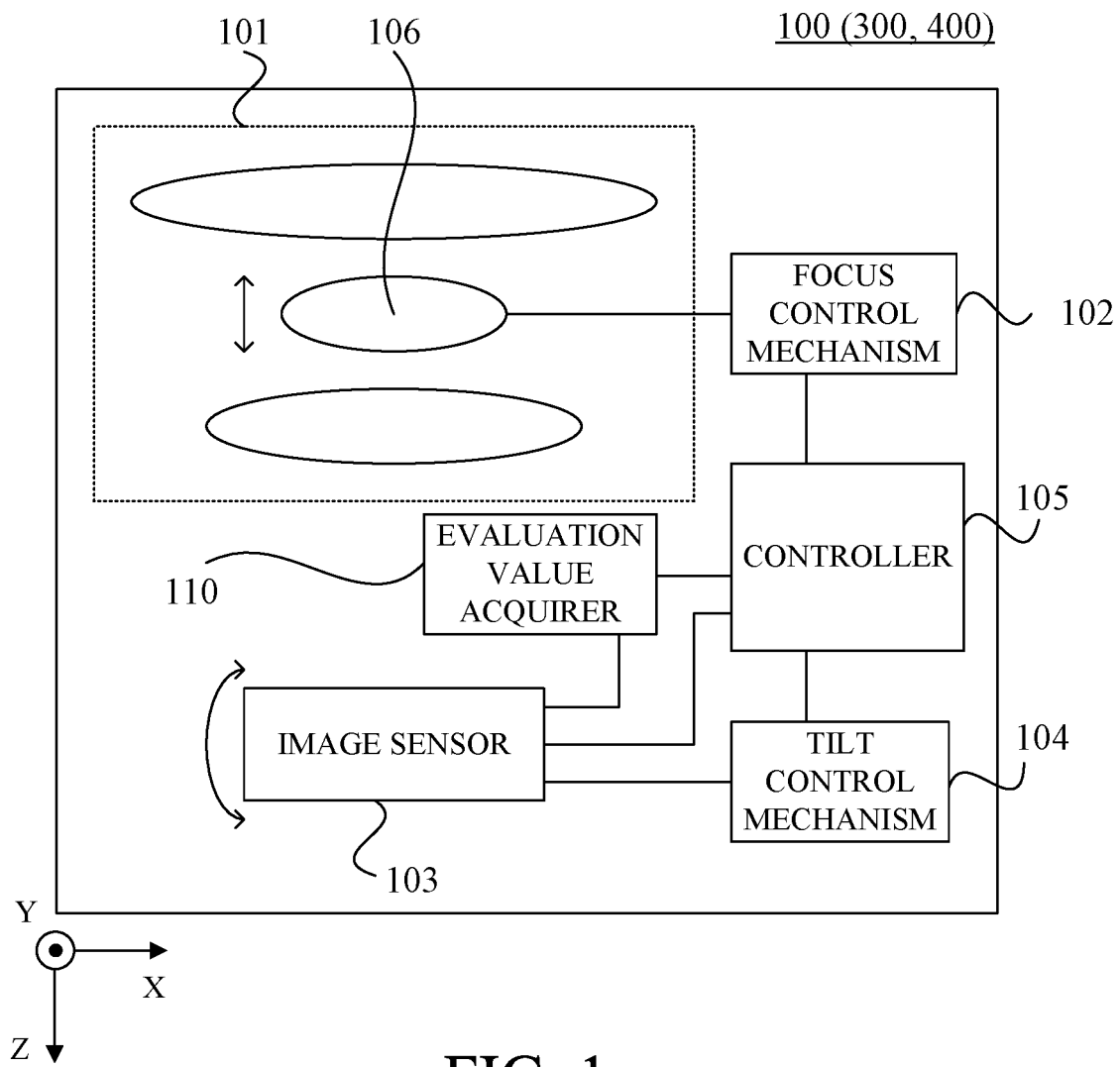
FIG. 1 is a block diagram of an imaging apparatus according to first, third, and fourth embodiments.

Referring now to the accompanying drawings, a description will be given of embodiments according to the present invention. Corresponding elements in respective figures will be designated by the same reference numerals, and a duplicate description thereof will be omitted.

First Embodiment

Referring now to FIG. 1, a description will be given of an imaging apparatus according to a first embodiment of the present invention. FIG. 1 is a block diagram of an imaging apparatus 100 according to this embodiment. The imaging apparatus 100 includes an imaging optical system 101, a focus control mechanism (focus controller) 102, an image sensor (solid-state image sensor) 103, a tilt control mechanism (angle controller) 104, a controller (exposure controller) 105, and an evaluation value acquirer (contrast evaluation value acquirer) 110.

The imaging optical system 101 has a plurality of lenses including a focus lens 106 that can move in an optical axis direction (Z-axis direction in FIG. 1). The focus control mechanism 102 moves a position of the focus lens 106 (focus position) in the optical axis direction using a drive mechanism such as a stepping motor and adjusts the focus position of the imaging optical system 101 (focus control). The image sensor 103 is a CMOS sensor or a CCD sensor, and photoelectrically converts an object image (optical image) formed via the imaging optical system 101 and outputs an image signal (pixel signal). The tilt control mechanism 104 rotates (changes) a direction (or orientation) of the image sensor 103. The controller 105 controls each mechanism of the imaging apparatus 100 such as the image sensor 103. The evaluation value acquirer 110 detects an evaluation value (contrast evaluation value) in a specific area (evaluation area, evaluation frame) of the image sensor 103 based on the pixel signal output from the image sensor 103.

The tilt control mechanism 104 that rotates the direction of the image sensor 103 includes a motor and a gear. The controller 105 can rotate the direction of the image sensor 103 on the XZ plane by controlling the current passing through the motor in the tilt control mechanism 104. The controller 105 also controls the driving of the image sensor 103 and the read operation of the pixel signal from the image sensor 103.

Figure 2:
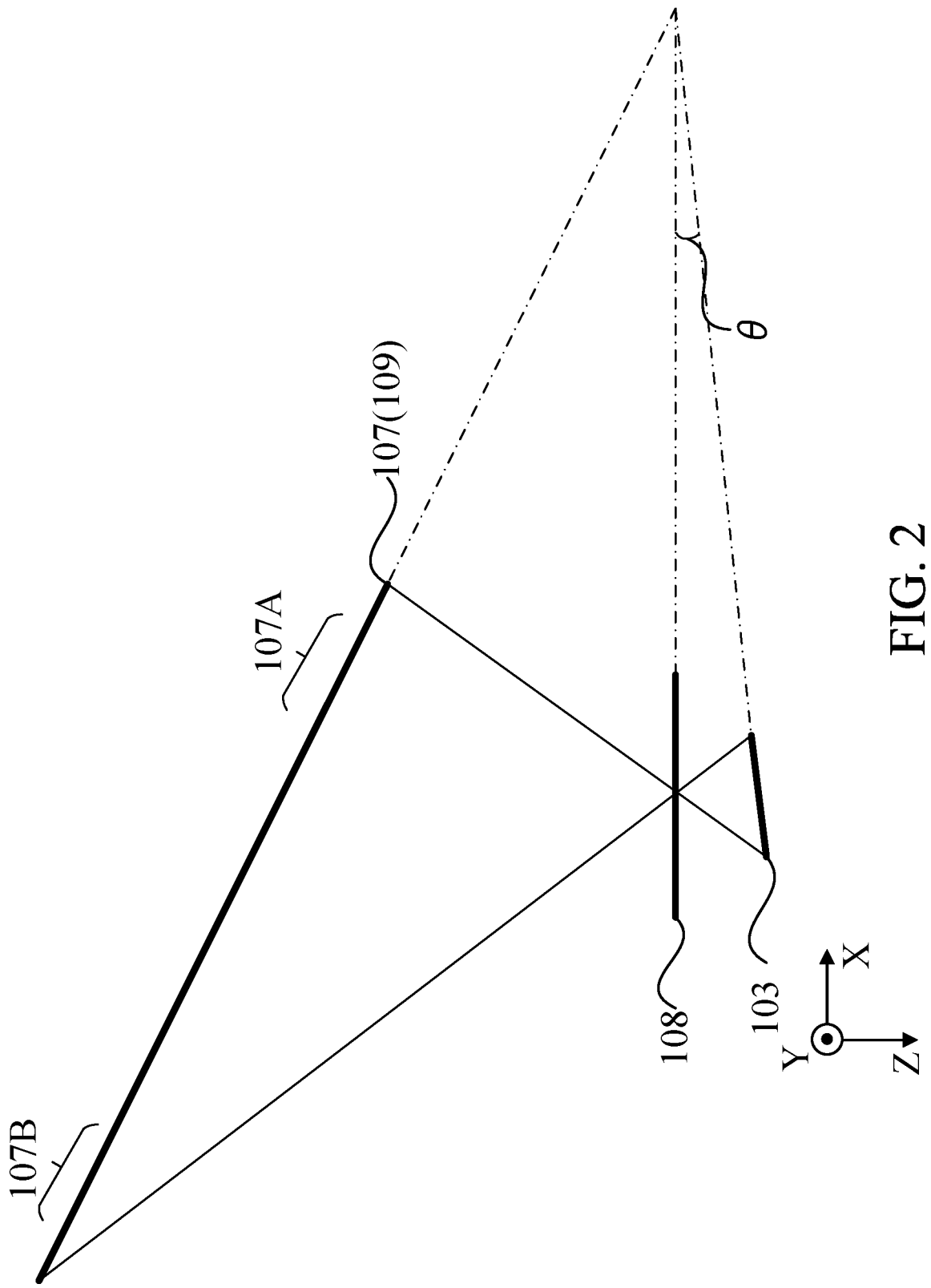
FIG. 2 explains a focal plane in tilt imaging according to the first embodiment.

Referring now to FIG. 2, a description will be given of a focus plane 107 in the tilt imaging. FIG. 2 explains the focal plane 107 in the tilt imaging. In accordance with the Scheimpflug principle, the light incident surface (imaging plane) of the image sensor 103, and the focal plane 107 tilt to the principal surface 108 of the imaging optical system 101 (plane orthogonal to the optical axis of the imaging optical system 101) on the XY plane. Hence, the tilt imaging enables the object surface 109 to match the focal plane 107 which tilt to the principal surface 108 of the imaging optical system 101. An angle θ formed between the light incident surface of the image sensor 103 and the principal surface 108 of the imaging optical system 101 will be referred to as the tilt angle.

Now assume that the object surface 109 observed by the user and the focal plane 107 do not coincide with each other during the tilt imaging. For example, when the user changes the direction of the imaging apparatus 100, or when the imaging optical system 101 includes an angle-of-view control mechanism and the user changes the field angle of the imaging optical system 101, the object surface 109 that the user observes changes and the object surface 109 and the focal plane 107 do not correspond to each other.

Thus, when the object surface 109 observed by the user and the focal plane 107 do not coincide with each other, it is necessary to sequentially adjust the focus position and the tilt angle as disclosed in JP 2017-173802. Hence, it takes a long time to adjust both the focus position and the tilt angle. Since this embodiment can acquire an image under a proper (or optimal) imaging condition when the focus position is adjusted and when the tilt angle is adjusted, the accuracy of each of the single focus position adjustment and the tilt angle adjustment. As a result, the smaller number of repetitions of driving the focus lens 106 (focus control) and tilt angle control (angle control) can quickly adjust the focus position and the tilt angle. This will be described in detail below.

Figure 3A:
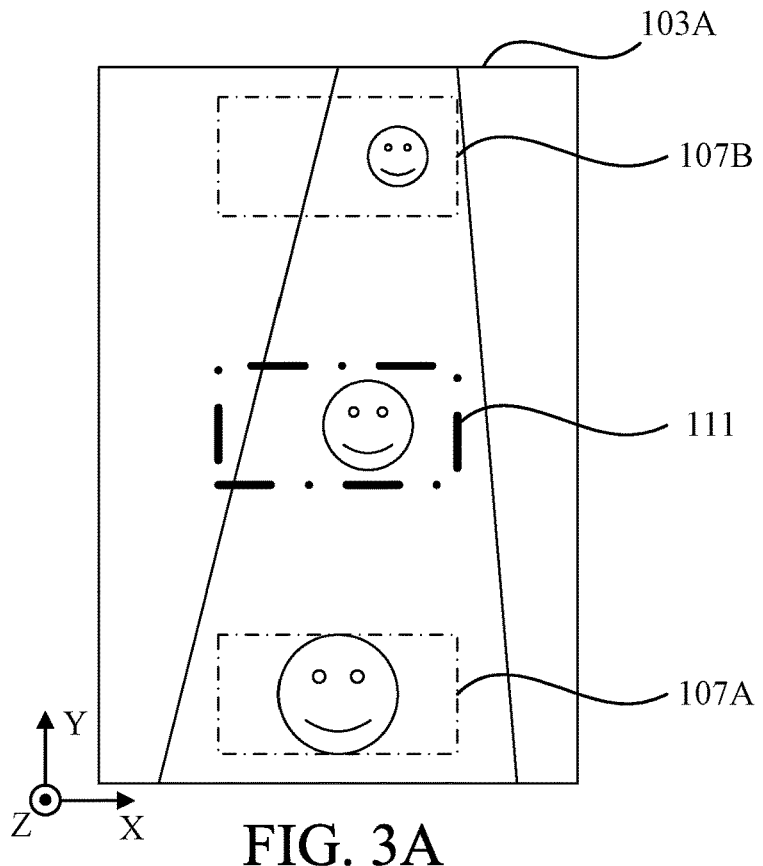
FIGS. 3A and 3B explain evaluation frames during a focus position adjustment and during a tilt angle adjustment according to the first embodiment.
Figure 3B:
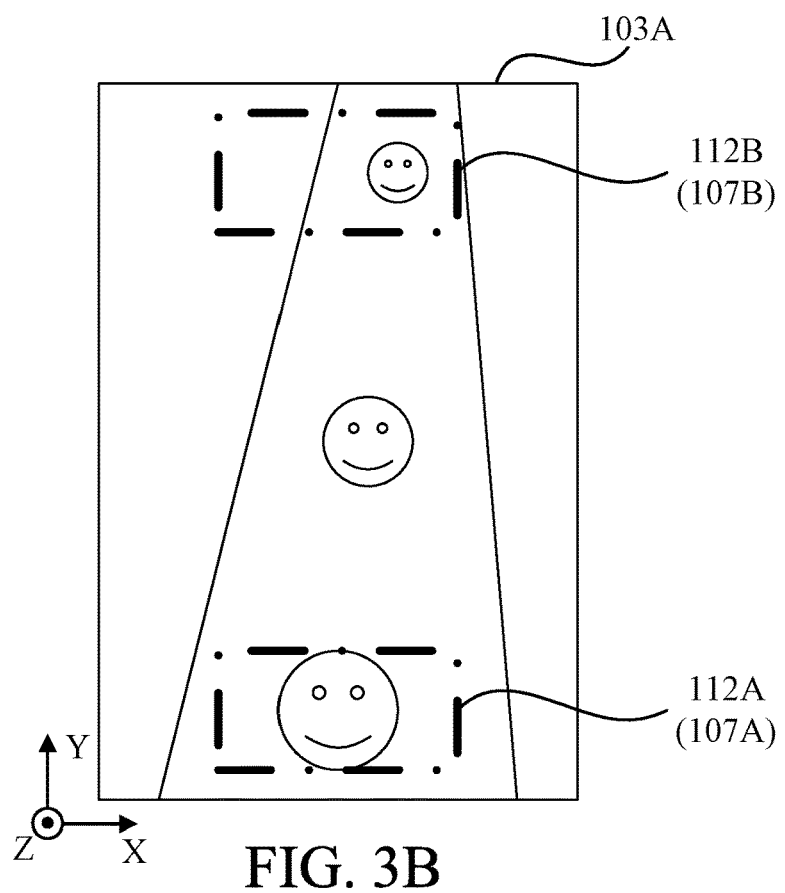

Referring now to FIGS. 3A and 3B, a description will be given of an evaluation frame of the image sensor 103 in adjusting the focus position and in adjusting the tilt angle. FIGS. 3A and 3B explain an evaluation frame (evaluation area) in adjusting the focus position and in adjusting the tilt angle. FIG. 3A illuminates an evaluation frame (first evaluation frame, first evaluation area) 111 for detecting a contrast evaluation value in adjusting the focus position. FIG. 3B illuminates evaluation frames (second evaluation frames, second evaluation areas) 112A and 112B for detecting a contrast evaluation value in adjusting the tilt angle. As illustrated in FIG. 3A, the evaluation frame 111 is included in the central area of the effective pixel area 103A of the image sensor 103. On the other hand, as illustrated in FIG. 3B, the evaluation frames 112A and 112B are included in the peripheral area (peripheral area in the direction parallel to the tilt direction (Y direction)) of the effective pixel area 103A of the image sensor 103. The areas 107A and 107B illustrated in FIGS. 3A and 3B correspond to the areas 107A and 107B on the focal plane 107 illustrated in FIG. 2.

The central area of the effective pixel area 103A is separated from the center of the effective pixel area 103A of the image sensor 103 in a direction (Y direction) parallel to the tilt direction of the image sensor 103 by 20% or less (or 10% or less) of a length of the image sensor 103 in a direction parallel to the tilt direction. Similarly, the peripheral area of the effective pixel area 103A is separated from the center of the effective pixel area 103A of the image sensor 103 in a direction (Y direction) parallel to the tilt direction of the image sensor 103 by 30% or more (or 40% or more) of the length of the image sensor 103 in the direction parallel to the tilt direction.

The imaging apparatus 100 (controller 105) according to this embodiment adjusts the exposure condition using the pixel signal of the evaluation frame 111 when the focus position is adjusted (during the focus control) as illustrated in FIG. 3A. On the other hand, when the tilt angle is adjusted (during the angle control) as illustrated in FIG. 3B, the imaging apparatus 100 determines the exposure condition using the pixel signals of the evaluation frames 112A and 112B. More specifically, the accumulation time and analog gain of the image sensor 103 may be adjusted during each adjustment.

Figure 4A:
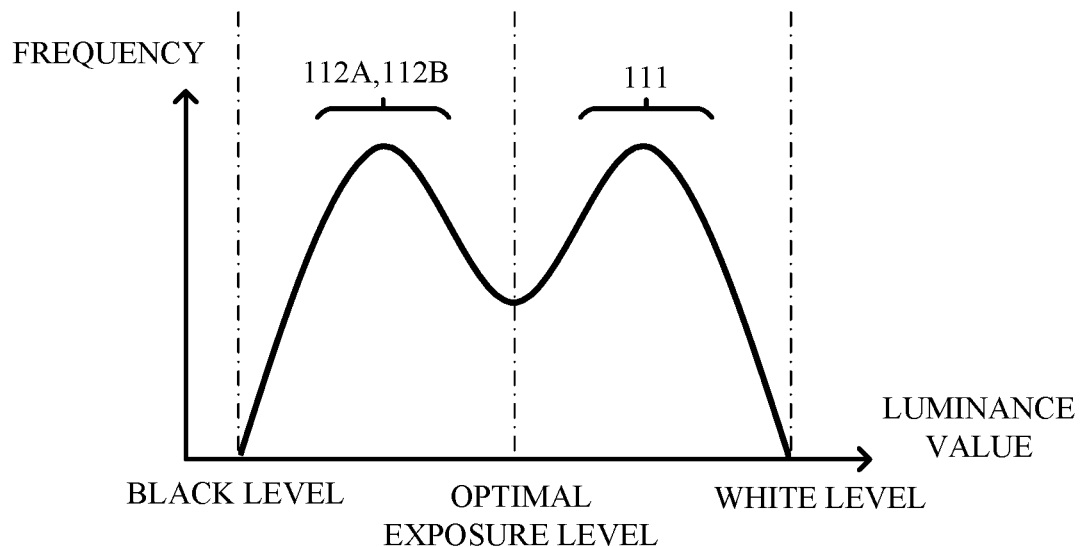
FIGS. 4A to 4C are histograms of luminance values according to the first embodiment.
Figure 4B:
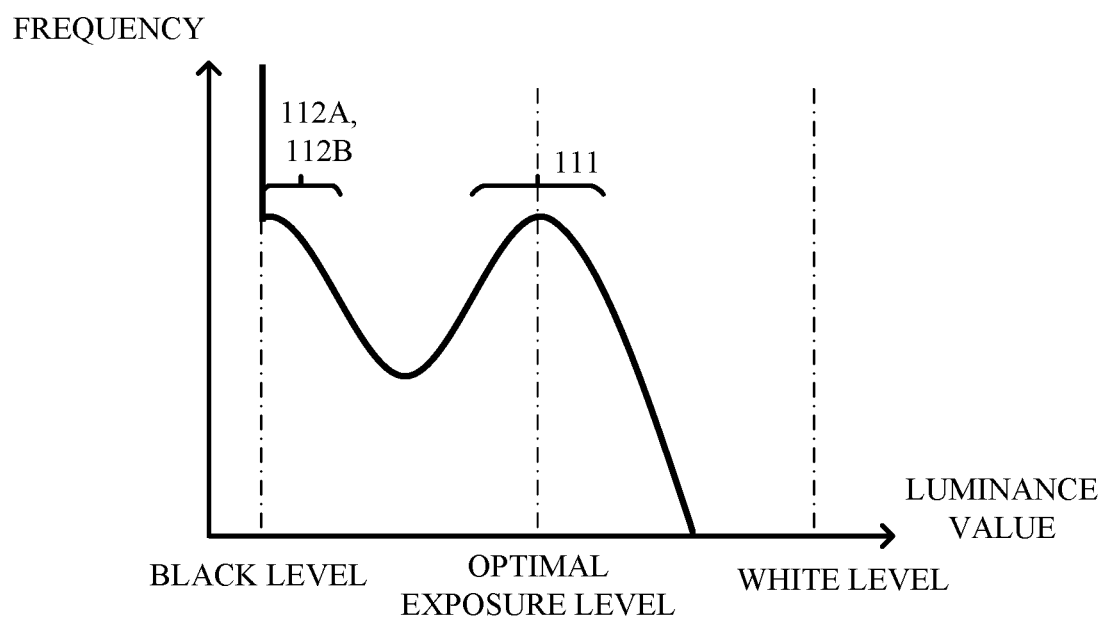
Figure 4C:
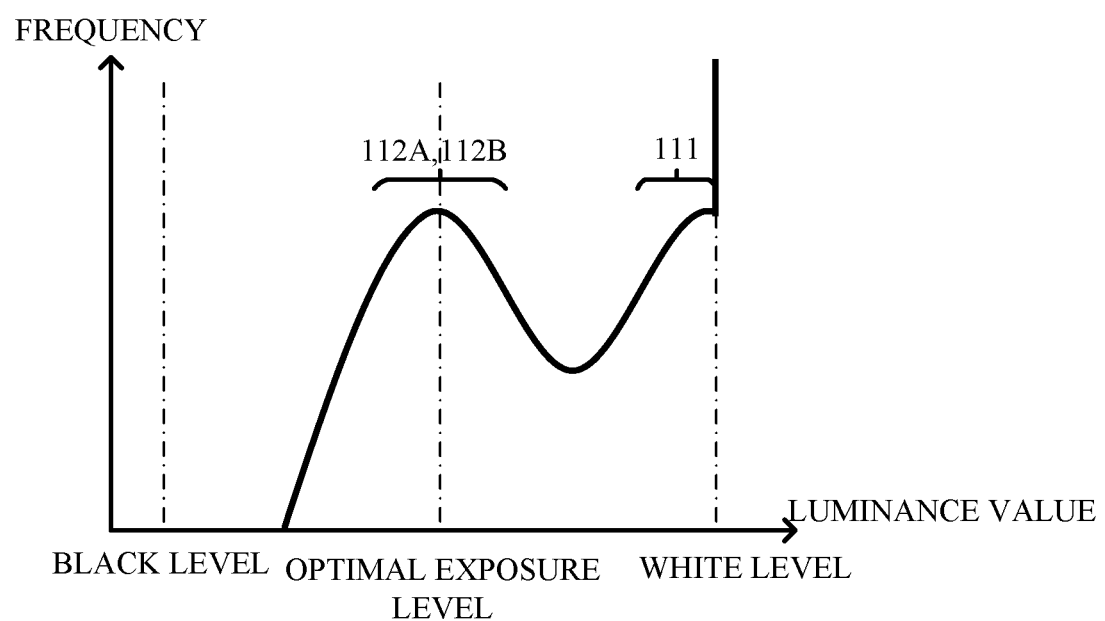

FIGS. 4A to 4C are histograms of the luminance values. In FIGS. 4A-4C, the abscissa axis represents the luminance value, and the ordinate axis represents the frequency. For example, assume that the image has a bright center and a dark periphery like the luminance value histogram illustrated in FIG. 4A or the evaluation frame 111 is bright and the evaluation frames 112A and 112B are dark. The focus position is adjusted, as illustrated in FIG. 4B, so that the evaluation frame 111 has a correct (proper or optimal) exposure level (exposure value). On the other hand, the tilt angle is adjusted, as illustrated in FIG. 4C, so that the evaluation frames 112A and 112B have correct (proper or optimal) exposure levels (exposure values). When the evaluation frames 112A and 112B have different luminances, the exposure level may be determined so that the average brightness of the evaluation frames 112A and 112B is correct (proper or optimal). The exposure level in each evaluation frame may be determined so that the average value or intermediate value of the pixel signals in the evaluation frames is an intermediate value between the black level and the white level.

As described above, the accuracy of the detected contrast evaluation value improves through imaging under the proper (or optimum) imaging condition (exposure condition) in each of the focus position adjustment and the tilt angle adjustment. As a result, the accuracy of each of the single focus position adjustment and the tilt angle adjustment improves. In other words, the number of repetitions of the focus lens driving (focus control) and the tilt angle control (angle control) reduces, and focus control and angle control can be performed in a short time.

A method for determining the optimum focus lens position and tilt angle from the contrast evaluation value may utilize a known method disclosed in JP 2017-173802. More specifically, in determining the position of the focus lens 106, the position that provides the highest contrast evaluation value of the evaluation frame 111 is set as the optimal focus lens position. In determining the tilt angle, the angle that provides the highest contrast evaluation value of each of the evaluation frames 112A and 112B is set as the optimal tilt angle. When the angle that provides the highest contrast evaluation value of the evaluation frame 112A and the angle that provides the highest contrast evaluation value of the evaluation frame 112B are different from each other, an intermediate angle may be set as the optimal tilt angle. The contrast evaluation value may use a difference between the maximum signal level and the minimum signal level of the pixel signal in the evaluation frame. The contrast evaluation value may utilize a difference between the upper 10% signal level and the lower 10% signal level in the histogram of the pixel signal.

Figure 5A:
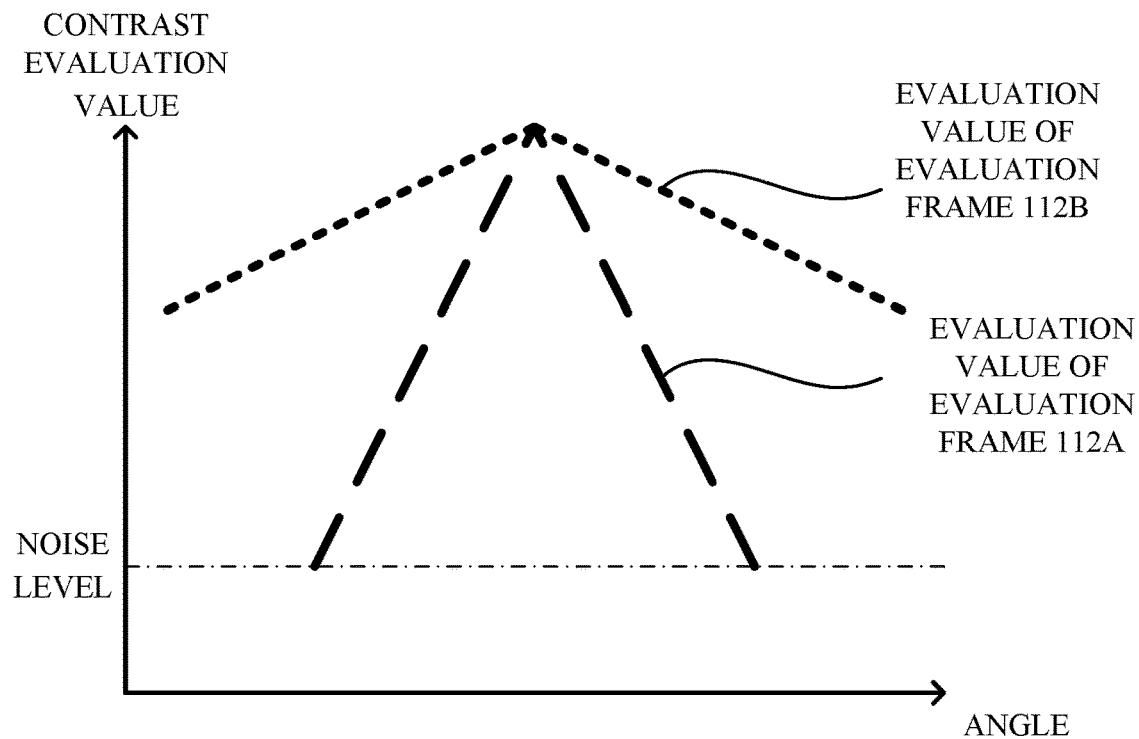
FIGS. 5A and 5B illustrate a relationship between an angle and a contrast evaluation value and a flowchart of a control method according to the first embodiment.

The above example discusses the contrast evaluation values of both the evaluation frames 112A and 112B detected in adjusting the tilt angle, but the contrast evaluation value of only one of the evaluation frames 112A and 112B may be detected. As illustrated in FIG. 2, the evaluation frame 112B (second partial evaluation area) has a distance from the imaging apparatus 100 to the object surface 109 longer than that of the evaluation frame 112A (first partial evaluation area). In general, when the distance to the object surface 109 is sufficiently long, the size of the circle of confusion of the imaging optical system 101 is inversely proportional to the square of the distance. Therefore, as illustrated in FIG. 5A showing the relationship between the tilt angle and the contrast evaluation value, a variation in the contrast evaluation value when the tilt angle is changed is smaller in the evaluation frame 112B than in the evaluation frame 112A. In other words, using the contrast evaluation value in the evaluation frame 112A can provide a higher search accuracy in searching for the optimal tilt angle. On the other hand, using the contrast evaluation value of the evaluation frame 112B can provide a wide search range in searching the optimal tilt angle, because of a small reduction degree in the contrast evaluation value when the difference increases between the current tilt angle and the optimal tilt angle.

Hence, when the difference between the current tilt angle and the optimum tilt angle is large, the tilt angle may be adjusted using the contrast evaluation value of the evaluation frame 112B. On the other hand, when the difference between the current tilt angle and the optimum tilt angle is small, the tilt angle may be adjusted using the contrast evaluation value of the evaluation frame 112A.

Figure 5B:
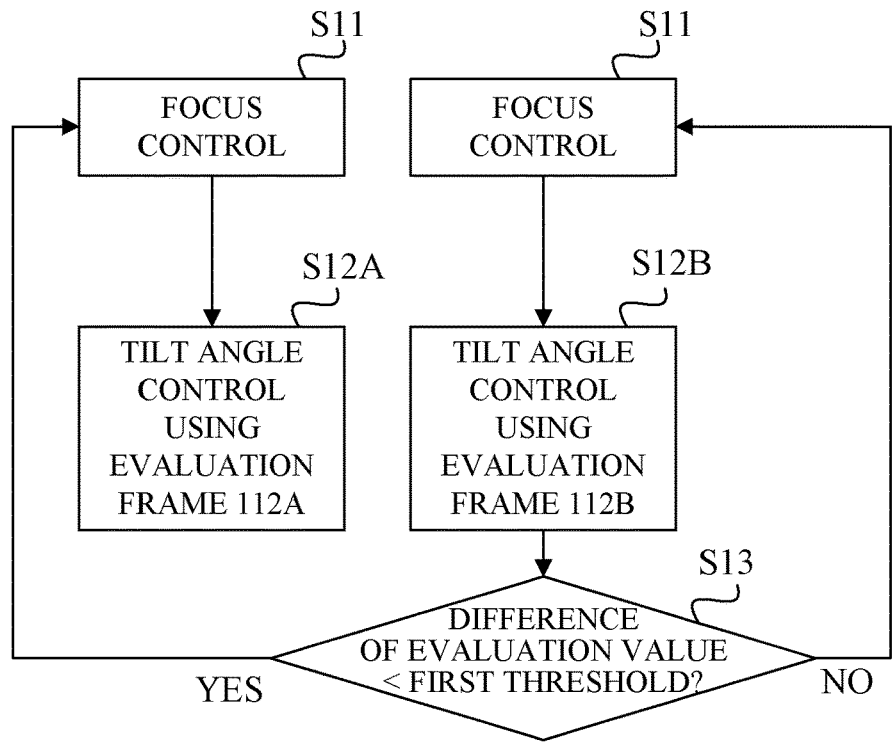

Referring now to FIG. 5B, a description will be given of a control method according to this embodiment. FIG. 5B is a flowchart of the control method. Each step of FIG. 5B is mainly executed by the controller 105.

First, in the step S11, the controller 105 acquires the contrast evaluation value of the evaluation frame 111 detected by the evaluation value acquirer 110 while driving the focus lens 106 using the focus control mechanism 102. Then, the controller 105 uses the focus control mechanism 102 to move the focus lens 106 to a position that corresponds to the maximum contrast evaluation value (focus control). Next, in the step S12B, the controller 105 acquires the contrast evaluation value of the evaluation frame 112B detected by the evaluation value acquirer 110 while controlling the tilt angle using the tilt control mechanism 104. Then, the controller 105 controls the tilt control mechanism 104 so that the tilt angle corresponds to the maximum contrast evaluation value (tilt angle control).

Next, in the step S13, the controller 105 determines whether or not a difference (variation amount) between the contrast evaluation value of the evaluation frame 112B before the step S12B is performed and the contrast evaluation value of the evaluation frame 112B after the step S12B is performed is smaller than a first threshold. When the contrast evaluation value difference is equal to or greater than the first threshold, the controller 105 performs focus control (focus position adjustment) in the step S11 and then performs the tilt angle control again in the step S12B. The controller 105 repeats this procedure, and when the contrast evaluation value difference becomes smaller than the first threshold in the step S13, the controller 105 performs the tilt angle control in the step S12A instead of the step S12B. In the step S12A, the controller 105 acquires the contrast evaluation value of the evaluation frame 112A detected by the evaluation value acquirer 110 while controlling the tilt angle using the tilt control mechanism 104. Then, the controller 105 controls the tilt control mechanism 104 so that the tilt angle corresponds to the maximum contrast evaluation value.

As described above, when the contrast evaluation value difference of the evaluation frame 112B during the angle control (before and after the single tilt angle adjustment) is large, the tilt angle is controlled based on the evaluation value of the evaluation frame 112B, and when the contrast evaluation value difference is small, the tilt angle is controlled based on the evaluation value of the evaluation frame 112A. Thereby, both the search range and the search accuracy of the tilt angle can be compromised.

In controlling the tilt angle using the contrast evaluation value of one of the evaluation frames 112A and 112B, the controller 105 may determine the exposure condition in accordance with the evaluation frame to be used. In other words, when the difference between the contrast evaluation values of the evaluation frame 112B before and after the step S12B is performed is equal to or larger than the first threshold, the exposure level of the evaluation frame 112B is optimized. On the other hand, when the difference between the contrast evaluation values of the evaluation frame 112B before and after the step S12B is performed is smaller than the first threshold, the exposure level of the evaluation frame 112A is optimized.

Instead of using one of the contrast evaluation values of the evaluation frames 112A and 112B, both evaluation values may be used by weighting each evaluation value. In other words, when the difference between the contrast evaluation values is equal to or larger than the first threshold, the coefficient (weighting coefficient) of the contrast evaluation value detected in the evaluation frame 112B is set larger than the coefficient (weighting coefficient) of the contrast evaluation value detected in the evaluation frame 112A. On the other hand, if the contrast evaluation value difference is smaller than the first threshold, the weighting coefficient of the contrast evaluation value detected in the evaluation frame 112A is set larger than the weighting coefficient of the contrast evaluation value detected in the evaluation frame 112B.

Second Embodiment

Figure 6:
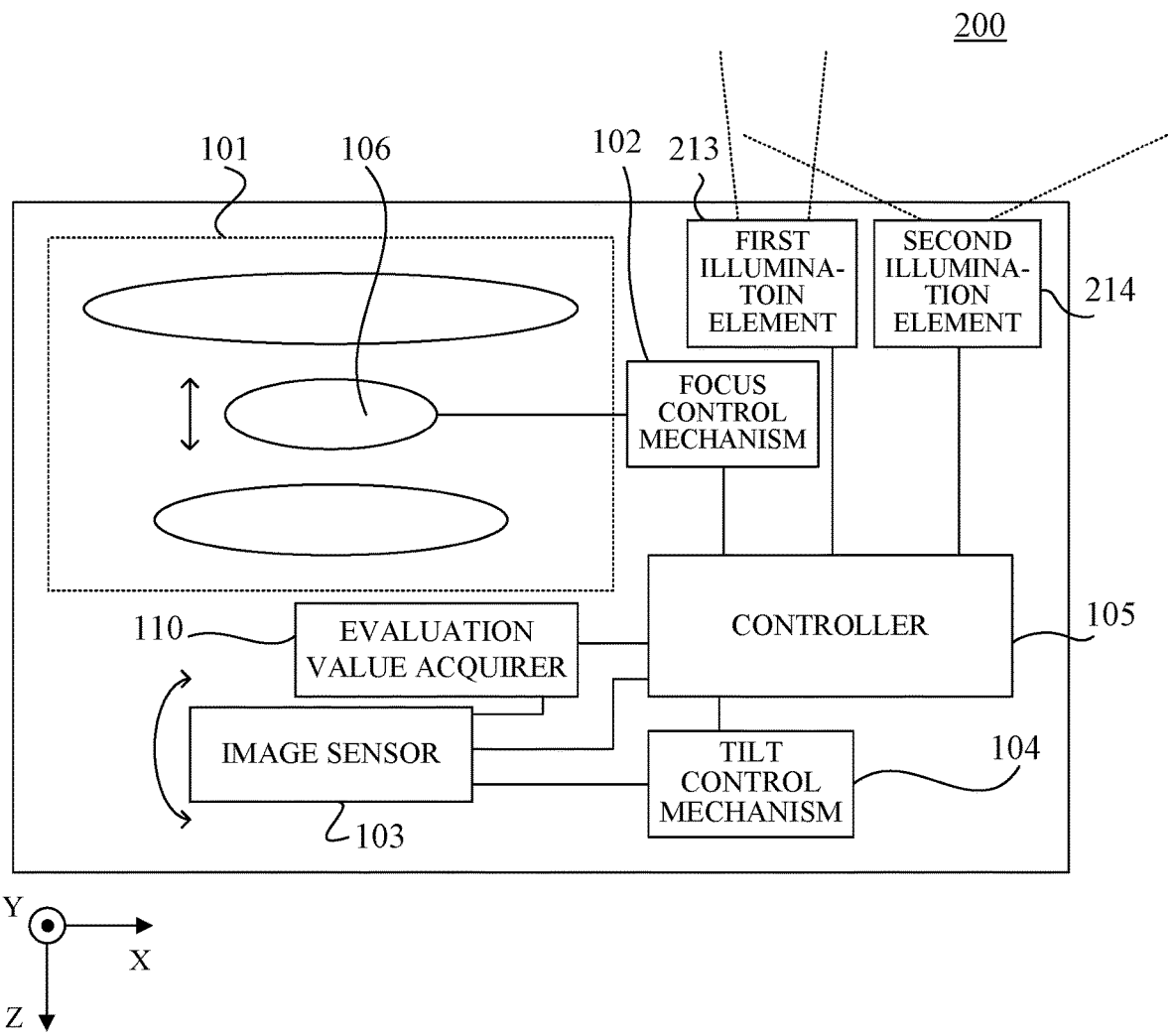
FIG. 6 is a block diagram of an imaging apparatus according to a second embodiment.
Figure 7A:
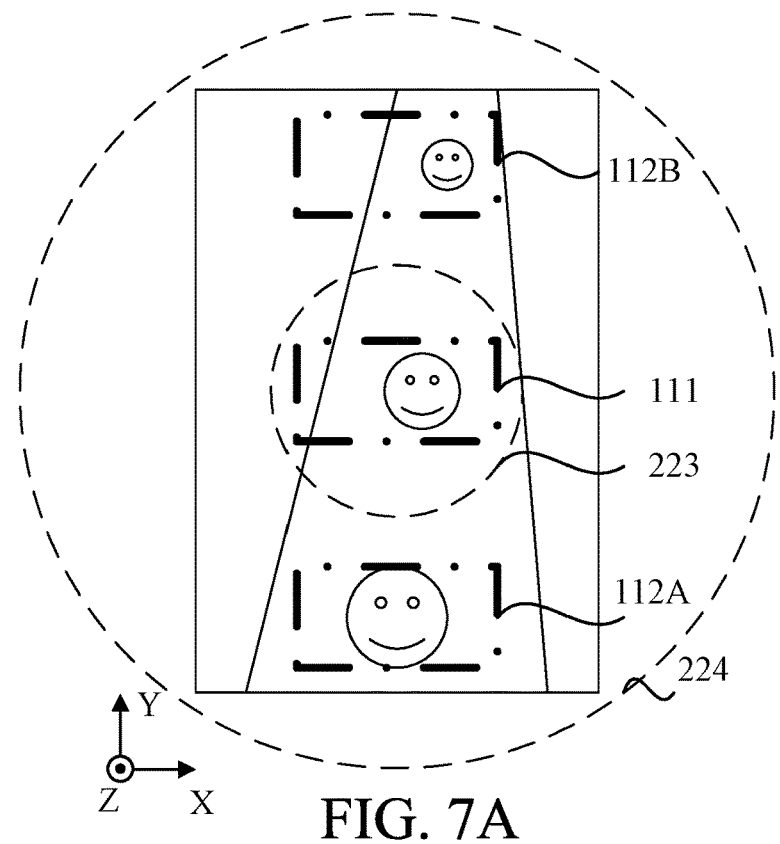
FIGS. 7A and 7B explain an illumination range of an illumination element according to the second embodiment.
Figure 7B:
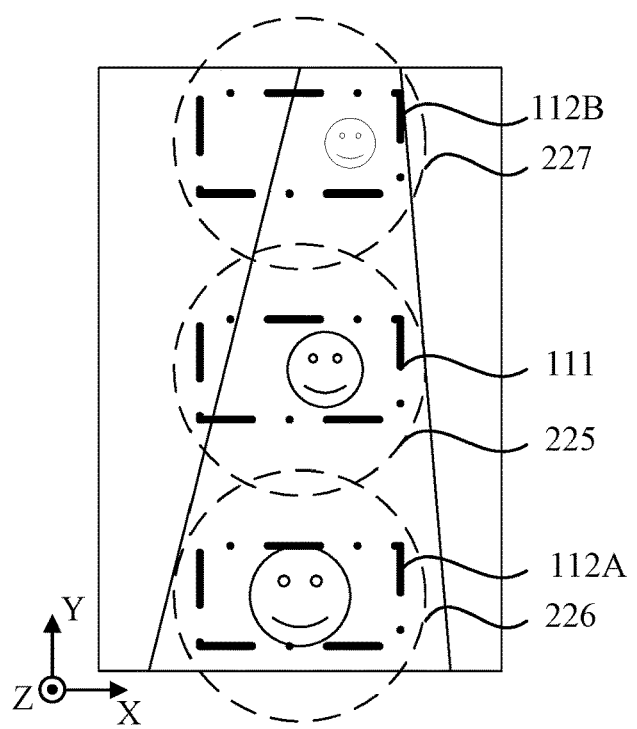

Referring now to FIGS. 6, 7A, and 7B, a description will be given of an imaging apparatus according to a second embodiment of the present invention. FIG. 6 is a block diagram of an imaging apparatus 200. FIGS. 7A and 7B explain illumination ranges of a first illumination element 213 and a second illumination element 214 in the imaging apparatus 200. The imaging apparatus 200 is different from the imaging apparatus 100 according to the first embodiment in that it includes a first illumination element (infrared LED) 213 and a second illumination element (infrared LED) 214 having the same optical axis direction and the same illumination intensity and different illumination ranges. In this embodiment, the illumination range of the second illumination element 214 is wider than the illumination range of the first illumination element 213.

More specifically, as illustrated in FIG. 7A, an illumination range 224 of the second illumination element 214 is an entire angle of view of the imaging apparatus 200, and an illumination range 223 of the first illumination element 213 is within an area that contains the evaluation frame 111 and its vicinity in the imaging apparatus 200. The illumination range refers to an area where the illumination intensity of illumination is half or more of the intensity peak. The optical axis of the illumination element is aligned with the center of gravity direction of the light intensity distribution emitted from the illumination element (first illumination element 213 or second illumination element 214).

The imaging apparatus 200 according to this embodiment uses the first illumination element 213 in adjusting the focus position (during the focus control), and the second illumination element 214 in adjusting the tilt angle (during the angle control). In this way, using the illumination element having an illumination range during the focus position adjustment, which is narrower than that during the tilt angle adjustment can improve the accuracy of each of the single focus position adjustment and the tilt angle adjustment particularly at a low luminance such as at night. As a result, the number of repetitions of the focus lens driving (focus control) and the tilt angle control (angle control) reduces, and focus control and angle control can be performed in a short time. This will be described in detail below.

In order to obtain a sharp object image at a low luminance such as at night, it is effective to increase the luminance using the illumination element such as an infrared LED. Increasing the luminance can provide an image at a higher S/N ratio, and consequently increase the reliability of the detected contrast evaluation value. As described above, the contrast evaluation value in the evaluation frame 111 is important in adjusting the focus position, and the contrast evaluation value in the evaluation frame 112 is important in adjusting the tilt angle. Since the illumination intensity per unit solid angle is higher in the first illumination element 213 than that in the second illumination element 214, using the first illumination element 213 can provide a reliability of the contrast evaluation value of the evaluation frame 111 higher than that of using the second illumination element 214. On the other hand, since the illumination range of the first illumination element 213 is narrower than the entire angle of view of the imaging apparatus 200, using the second illumination element 214 can provide reliabilities of the contrast evaluation values of evaluation frames 112A and 112B higher than those of using the first illumination element 213.

Hence, in adjusting the focus position, the accuracy of the focus position adjustment is improved by improving the reliability of the contrast evaluation value of the evaluation frame 111 using the first illumination element 213. On the other hand, in adjusting the tilt angle, the accuracy of the tilt angle adjustment is improved by improving the reliability of the contrast evaluation value of the evaluation frame 112 using the second illumination element 214. Thereby, the number of repetitions of the focus lens driving (focus control) and tilt angle control (angle control) reduces, and the focus control and angle control can be performed in a short time.

Thus, this embodiment can acquire an image at a higher S/N ratio by using the different illumination element between the focus position adjustment and the tilt angle adjustment. In other words, this embodiment is a variation in which a different optimal exposure condition is used between the focus position adjustment and the tilt angle adjustment.

In the above description, only the second illumination element 214 is used for the focus position adjustment and only the first illumination element 213 is used for the tilt angle adjustment, but a ratio of the current passing through the first illumination element 213 to the current passing through the second illumination element 214 may be changed. More specifically, the ratio of the current flowing through the second illumination element 214 to the current flowing through the first illumination element 213 during the tilt angle adjustment is made larger than that during the focus position adjustment. Thereby, the reliability of the contrast evaluation value of the evaluation frame 111 can be improved during the focus position adjustment, and the reliability of the contrast evaluation value of the evaluation frame 112 can be improved during the tilt angle adjustment.

When the first illumination element 213 and the second illumination element 214 are used for both of the focus position adjustment and the tilt angle adjustment, the power consumption may increase and a resultant temperature may rise. In general, the higher the temperature is, the lower the performance of the image sensor 103 becomes. As a result, the S/N ratio of the captured image decreases. In particular, at the low luminance, a decrease in the S/N ratio of the image due to a temperature rise becomes a big problem. Thus, the first illumination element 213 may be used for the focus position adjustment and the second illumination element 214 may be used for the tilt angle adjustment, rather than using the first illumination element 213 and the second illumination element 214 for both of the focus position adjustment and the tilt angle adjustment.

Instead of using a plurality of illumination elements having different illumination ranges, this embodiment provides an illumination optical system on the light exit side of the first illumination element 212, and drives part of the lenses in the illumination optical system in the optical axis direction, thereby controlling the illumination range.

FIG. 6 illustrates the same directions of the optical axes among the plurality of illumination elements (first illumination element 213 and second illumination element 214), but a plurality of illumination elements may have different optical axis directions. Tilting the optical axis direction of the illumination element to the optical axis direction of the imaging optical system 101 can selectively illuminate a specific area within the angle of view.

FIG. 7B illustrates this example. In this case, the imaging apparatus 200 includes a third illumination element (not shown) that selectively illuminates an area corresponding to the evaluation frame 111 on the image plane, and fourth and fifth illumination elements (not shown) that selectively illuminate areas corresponding to the evaluation frames 112A and 112B on the image plane. The evaluation frame 112A is a first partial evaluation area, and the evaluation frame 112B is a second partial evaluation area. In FIG. 7B, reference numeral 225 denotes an illumination range of the third illumination element, reference numeral 226 denotes an illumination range of the fourth illumination element, and reference numeral 227 denotes an illumination range of the fifth illumination element.

Using the third illumination element for the focus position adjustment and using the fourth and fifth illumination elements for the tilt angle adjustment can improve the accuracy of each of the single focus position adjustment and the tilt angle adjustment. At this time, as described above, a ratio of the current flowing through each illumination element may be changed. More specifically, a ratio of the average value of the current flowing through the fourth illumination element and the current flowing through the fifth illumination element, to the current flowing through the third illumination element during the tilt angle adjustment may be made larger than that during the focus position adjustment. Thereby, the reliability of the contrast evaluation value of the evaluation frame 111 can be improved during the focus position adjustment, and the reliability of the contrast evaluation value of the evaluation frame 112 can be improved during the tilt angle adjustment.

As illustrated in FIG. 2, the evaluation frame 112B has a distance from the illumination element to the object surface longer than that of the evaluation frame 112A. In general, the luminance on the object surface decreases in inverse proportion to the square of the distance from the illumination element. Hence, the illumination intensity of the fifth illumination element may be made larger than the illumination intensity of the fourth illumination element. More specifically, in adjusting the tilt angle, the current flowing through the fifth illumination element is set larger than the current flowing through the fourth illumination element.

As described above, when a plurality of illumination elements are simultaneously used, the S/N ratio of the image is reduced due to the temperature rise. Thus, the illumination intensity of the fifth illumination element may be increased and the illumination intensity of the fourth illumination element may be decreased. When the angle formed between the principal surface 108 of the imaging optical system 101 and the object surface 109 is large, the S/N ratio of the evaluation frame 112B is improved while the temperature rise is suppressed by using only the fifth illumination element.

Instead of using a plurality of illumination elements having different optical axes directions, a specific area within the angle of view may be selectively illuminated by rotating the illumination element itself. When the illumination element itself rotates, it is difficult to simultaneously illuminate both the evaluation frames 112A and 112B during the tilt angle adjustment and thus the evaluation frame 112B having a long distance from the illumination element to the object surface may be selectively illuminated.

Third Embodiment

Referring now to FIGS. 8A to 10B, a description will be given of an imaging apparatus according to a third embodiment of the present invention. An image capturing apparatus 300 according to this embodiment changes the read operation of the pixel signal from the image sensor 103 between the focus position adjustment and the tilt angle adjustment. In other words, the controller 105 reads the pixel signal in the first read operation during the focus control, and reads the pixel signal in the second read operation different from the first read operation during the angle control. Thereby, the focus control and the angle control can be performed in a short time. The image sensor 103 according to this embodiment is a CMOS image sensor that sequentially reads out the pixel signal for each row. The basic configuration of the imaging apparatus 300 is the same as that of the imaging apparatus 100 in FIG. 1, and thus a description thereof will be omitted.

In general, there are three major rate-controlling factors that determine a time for reading a pixel signal for one frame from a CMOS image sensor. The first factor is a pixel circuit drive time for converting light incident on each pixel into a pixel signal and for reading it out at a vertical signal line provided for each column. The second factor is a time (pixel signal read time) for reading a pixel signal output from each pixel circuit at a timing shifted for each row for the vertical signal line provided for each column. Therefore, the time limited by the second factor becomes shorter as the number of rows from which the pixel signal is read is smaller. The third factor is a time (pixel signal output time) for outputting a pixel signal for one row sequentially read row by row to the outside of the image sensor 103. Hence, the time limited by the third factor becomes shorter as the number of columns from which the pixel signal is read is smaller. When the CMOS image sensor having an analog-to-digital conversion function is used, a time for the analog-to-digital conversion of a pixel signal for one column becomes a rate-controlling factor of time. However, this rate-controlling factor can be considered to be included in the third factor because it becomes shorter as the number of columns for reading the pixel signal is smaller.

Thus, the length of time for reading the pixel signal for one frame is determined by a product of a longer one of the pixel circuit drive time and the pixel signal output time, and the pixel signal read time. The magnitude relationship between the pixel circuit drive time and the pixel signal output time depends on the image sensor 103.

Even when the same image sensor is used, a magnitude relationship between the pixel circuit drive time and the pixel signal output time differs depending on the drive mode of the image sensor. In other words, the pixel signal output time is longer when the number of columns for reading the pixel signal is larger than the specific number of columns, and the pixel circuit drive time is longer when the number of columns for reading the pixel signal is smaller than the specific number of columns.

As described above, regardless of the image sensor to be used and the drive mode of the image sensor, the smaller the number of rows for reading a pixel signal is, the shorter the time for reading the pixel signal for one frame becomes. Also, depending on the image sensor to be used and the drive mode of the image sensor, a product of the number of rows for reading a pixel signal and the number of columns for reading a pixel signal or the smaller the number of pixel signals to be read is, the shorter the time for reading becomes.

Figure 8A:
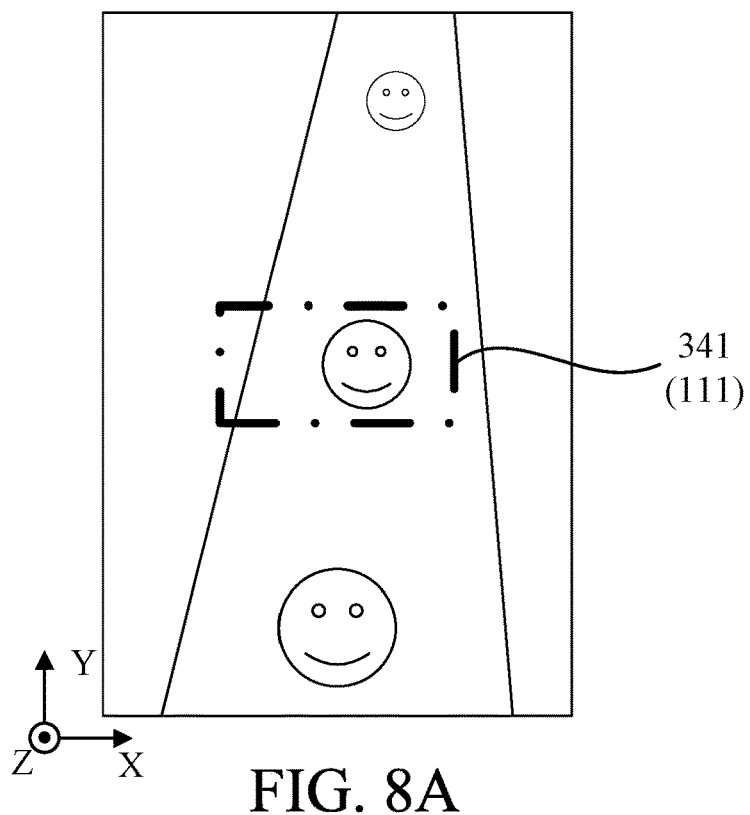
FIGS. 8A and 8B explain a read range of a pixel signal according to the third embodiment.
Figure 8B:
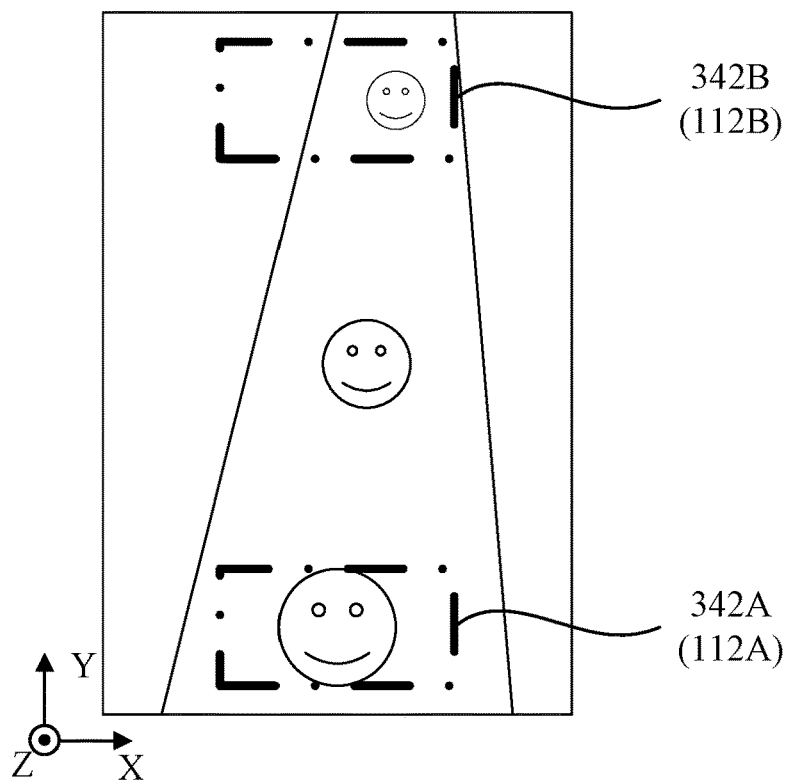

FIGS. 8A and 8B explain a read range of the pixel signal, and illustrate a first range 341 and a second range 342 used to read the pixel signal from the image sensor 103 in each of the focus position adjustment (FIG. 8A) and the tilt angle adjustment (FIG. 8B). During the focus position adjustment, the pixel signal is read out of the first range 341 as illustrated in FIG. 8A. On the other hand, during the tilt angle adjustment, the pixel signal is read out of the second ranges 342A and 342B as illustrated in FIG. 8B. Thus, the imaging apparatus according to this embodiment reads the pixel signal only out of the range of the evaluation frame from which the contrast evaluation value is acquired, in each of the focus position adjustment and the title angle adjustment. As described above, the smaller the number of pixel signals to be read is, the shorter the time for reading the pixel signal for one frame becomes. Hence, each of the single focus position adjustment and the tilt angle adjustment itself can be made faster.

FIGS. 8A and 8B illustrate that the evaluation frame 111 corresponds to the first range 341, and the evaluation frames 112A and 112B correspond to the second ranges 342A and 342B, but the present invention is not limited to this embodiment and they do not have to correspond to each other. More specifically, the first range 341 includes the evaluation frame 111 and the second ranges 342A and 342B include the evaluation frames 112A and 112B, respectively. In order to read only part of the pixel signals out of the image sensor 103, a pixel circuit is driven, and each of a horizontal scanning circuit that outputs the pixel signal to the outside of the image sensor 103, and a vertical scanning circuit that reads out the pixel signal to the vertical signal line may provide a skip function.

This embodiment may use one of the evaluation frames 112A and 112B as the contrast evaluation value. In this case, during the tilt angle adjustment, it is only necessary to read one of the pixel signals of the evaluation frames 112A and 112B for detecting the contrast evaluation value. Reading the pixel signal of one of the evaluation frames 112A and 112B can make the time for reading the pixel signal for one frame shorter than that when the pixel signal is read out of both the evaluation frames 112A and 112B. For example, the controller 105 determines a difference (variation amount) in contrast evaluation value during the angle control (before and after the single angle adjustment). When the difference is larger than the first threshold, the controller 105 reads the pixel signal in the evaluation frame 112B (second partial evaluation area). On the other hand, when the difference is smaller than the first threshold, the controller 105 reads the pixel signal in the evaluation frame 112A (first partial evaluation area).

As described above, depending on the image sensor to be used and the drive mode of the image sensor, a time for reading the pixel signal for one frame does not change even if the number of columns for reading the pixel signal is reduced. Thus, depending on the image sensor to be used and the drive mode of the image sensor, only the number of rows for reading the pixel signal may be reduced.

Figure 9A:
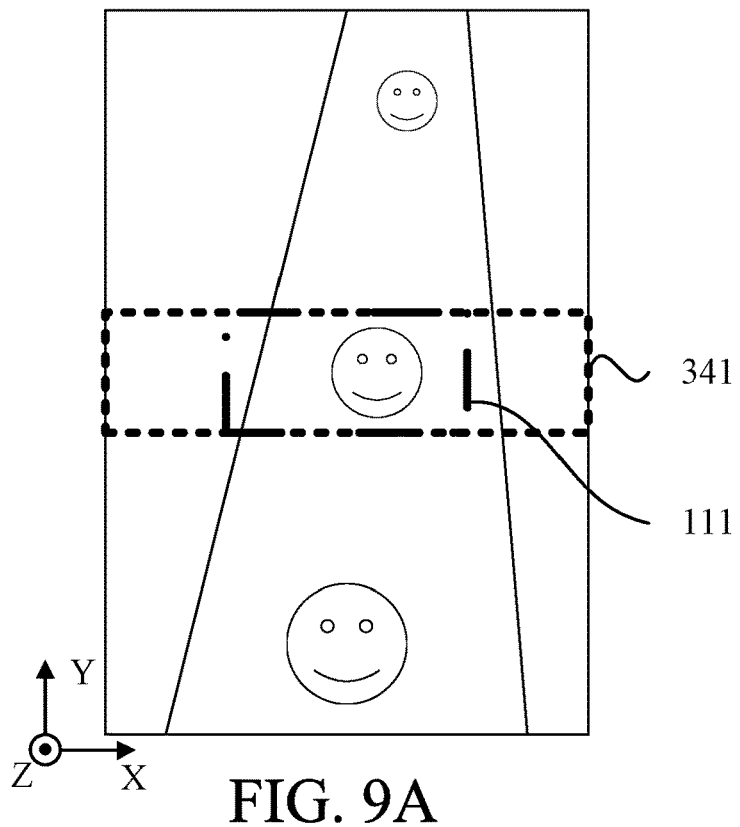
FIGS. 9A and 9B explain a read range of a pixel signal according to the third embodiment.
Figure 9B:
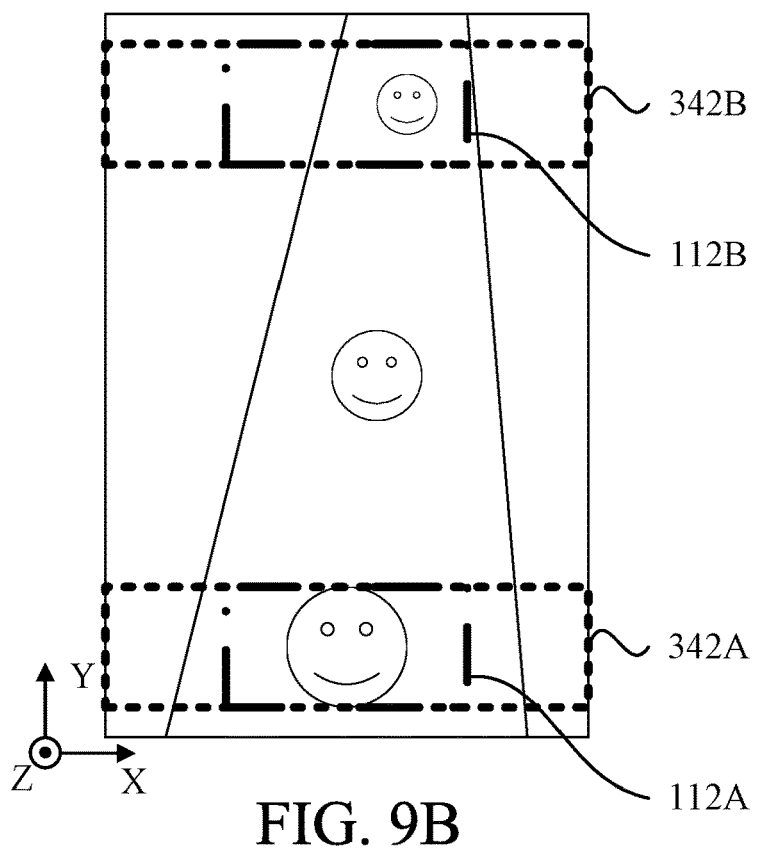

Thus, in controlling only the number of rows for reading the pixel signal, the column direction of the image sensor 103 (direction in which the pixel signal is sequentially read) may be set parallel to the tilt direction of the image sensor 103 (vertical direction in FIGS. 8A and 8B). Referring now to FIGS. 9A and 9B, a description will be given of this reason. FIGS. 9A and 9B explain the read range of the pixel signal, and illustrate the first range 341 and second range 342 used to read the pixel signal from the image sensor 103 in each of the focus position adjustment (FIG. 9A) and the tilt angle adjustment (FIG. 9B).

As illustrated in FIGS. 8A and 8B, the evaluation frame 111 used for the focus position adjustment and the evaluation frames 112A and 112B used for the tilt angle adjustment shift to each other in a direction parallel to the tilt direction. Accordingly, when only the number of rows for reading the pixel signal is limited, as illustrated in FIGS. 9A and 9B, the range for reading the pixel signal may be changed between the focus position adjustment and the tilt angle adjustment in the direction parallel to the tilt direction. In other words, the column direction of the image sensor 103 may coincide with the direction parallel to the tilt direction of the image sensor 103.

The following may be used to change whether to decrease both the number of rows and the number of columns for reading the pixel signal or to reduce only the number of rows for reading the pixel signal, depending on the drive mode of the image sensor 103. In other words, when the number of columns for reading the pixel signal is larger than the specific number of columns, both the number of rows and the number of columns for reading the pixel signal are reduced. On the other hand, when the number of columns for reading the pixel signal is smaller than the specific number of columns, only the number of rows for reading the pixel signal is reduced.

Figure 10A:
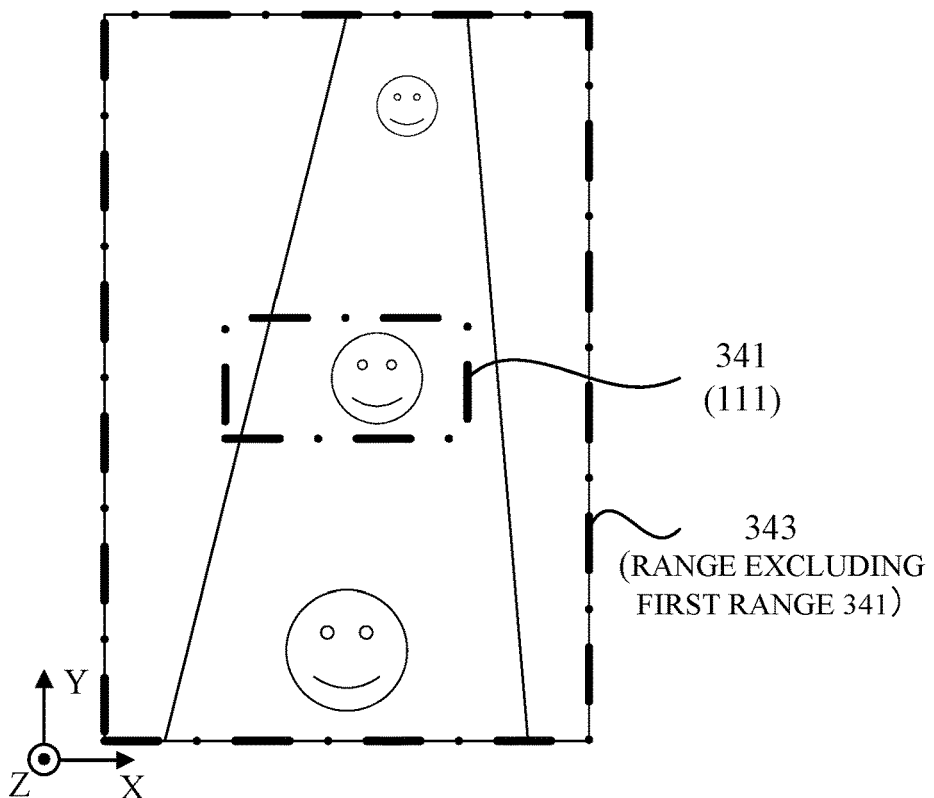
FIGS. 10A and 10B explain a range for changing the read operation of the pixel signal according to the third embodiment.
Figure 10B:
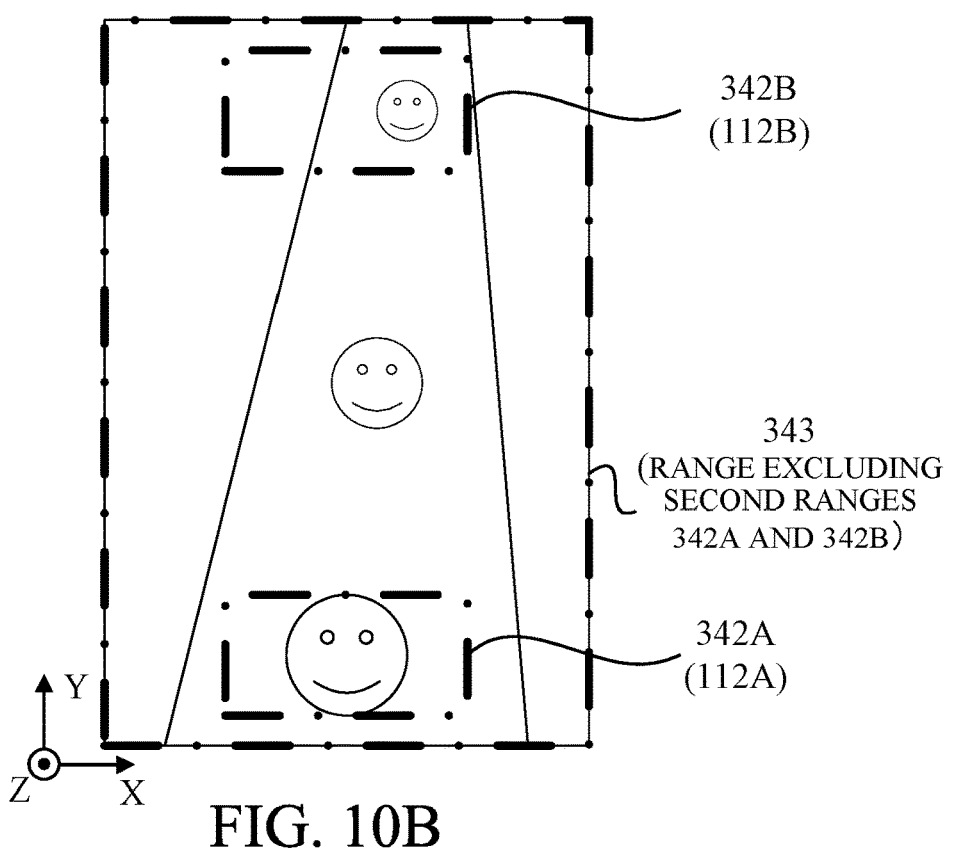

In the above description, the pixel signal is not read out of an area other than the evaluation frame (and the vicinity thereof) during the focus position adjustment and during the tilt angle adjustment. However, the time for reading the pixel signal for one frame may be controlled by changing the read operation between the evaluation frame (and its vicinity) and an area other than the evaluation frame (and its vicinity). Referring now to FIGS. 10A and 10B, a description will be given of specific examples.

FIGS. 10A and 10B explain a range in which the pixel signal read operation is changed. During the focus position adjustment, as illustrated in FIG. 10A, all pixel signals are read from the first range 341 that coincides with the evaluation frame 111. On the other hand, in the third range 343 excluding the first range 341 (evaluation frame 111), the pixel signal are thinned out and read. On the other hand, during the tilt angle adjustment, as illustrated in FIG. 10B, all pixel signals are read from second ranges 342A and 342B that coincide with the evaluation frames 112A and 112B. On the other hand, in the fourth range 344 excluding the second range 342 (evaluation frames 112 and 112B), the pixel signal is thinned out and read.

Thus, by making the density of the pixel signal read out of an area other than the evaluation frame (and the vicinity thereof) smaller than the density of the pixel signal read out of the evaluation frame (and the vicinity thereof), a time for reading the pixel signal for one frame can become shorter than that when all the pixel signals are read. When the pixel signal from the area other than the evaluation frame (and the vicinity thereof) is not read out, this scheme corresponds to the density of the pixel signal read out of the area other than the evaluation frame (and the vicinity thereof) being zero.

As described above, when the focus position is controlled (focus control is performed), a sampling pitch for reading the pixel signal from a third range 343 other than the first range 341 is made larger than a sampling pitch for reading the pixel signal from the first range 341. On the other hand, when the tilt angle is controlled (angle control is performed), a sampling pitch for reading the pixel signal from a fourth range 344 other than the second ranges 342A and 342B is made larger than a sampling pitch for reading the pixel signal from each of the second ranges 342A and 342B. Thereby, necessary image information can be acquired while each of the single focus position adjustment and the tilt angle adjustment is made faster.

As illustrated in FIGS. 8A and 8B, not reading the pixel signal from an area other than the evaluation frame (and its vicinity) can make faster each of the single focus position adjustment and the tilt angle adjustment because the number of pixel signals to be read is smaller. On the other hand, as illustrated in FIGS. 10A and 10B, reading part of the pixel signal from an area other than the evaluation frame (and its vicinity) enables image information of the other area to be simultaneously acquired, while acquiring the contrast evaluation value in the evaluation frame.

In general, when the object surface is focused, a sampling pitch of the image is rough by thinning and reading the pixel signal, and the resolution of the acquired image is reduced. However, during the focus position adjustment or during the tilt angle adjustment, the object surface is not focused and thus the image resolution is mainly determined by the resolving performance of the imaging optical system 101 rather than the pixel sampling pitch. Hence, during the focus position adjustment or during the tilt angle adjustment, even if the pixel signal is thinned and read, the reduction degree in the image resolution is insignificant.

As described above, during the focus position adjustment or during the tilt angle adjustment, the pixel signal is thinned and read out of an area other than the evaluation frame after the adjustment, and thereby necessary image information can be acquired while each of the single focus position and tilt angle adjustment is made faster. The number of pixel signals to be read may be reduced by adding or averaging the plurality of pixel signals without thinning out the pixel signals. By adding or averaging a plurality of pixel signals, the S/N ratio of the image becomes higher than that where the pixel signals are thinned out.

At least two of the controls according to the first embodiment, the second embodiment, and the third embodiment may be used in combination. In other words, both the exposure condition including the illumination and the pixel signal read range from the image sensor may be changed between the focus position adjustment and the tilt angle adjustment. Changing the exposure condition including the illumination can improve the accuracy of each of the single focus position adjustment and tilt angle adjustment and reduce the number of repetitions of the focus lens driving (focus control) and the tilt angle control (angle control). Changing the read range of the pixel signal from the image sensor can shorten the time for reading the pixel signal for one frame, and accelerate each of the single focus position adjustment and the tilt angle adjustment.

Fourth Embodiment

Figure 11:
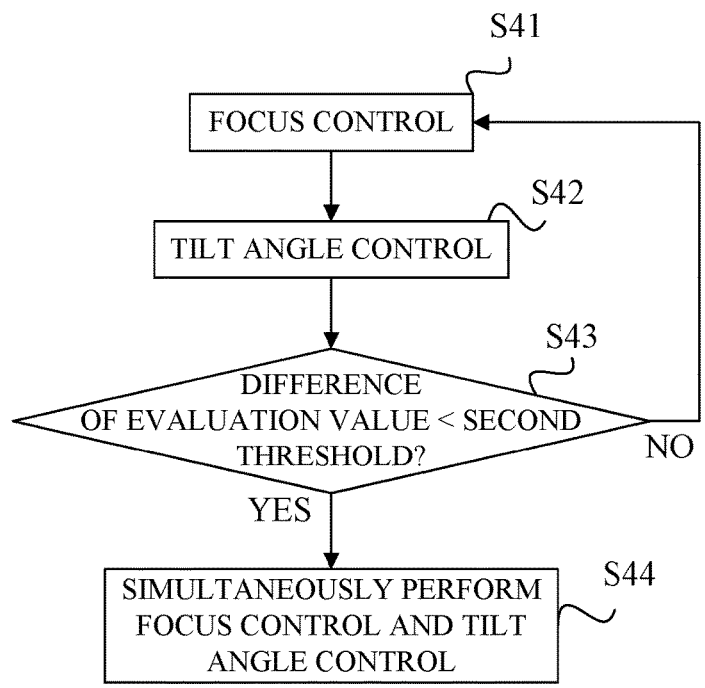
FIG. 11 is a flowchart of a control method according to the fourth embodiment.
Figure 12:
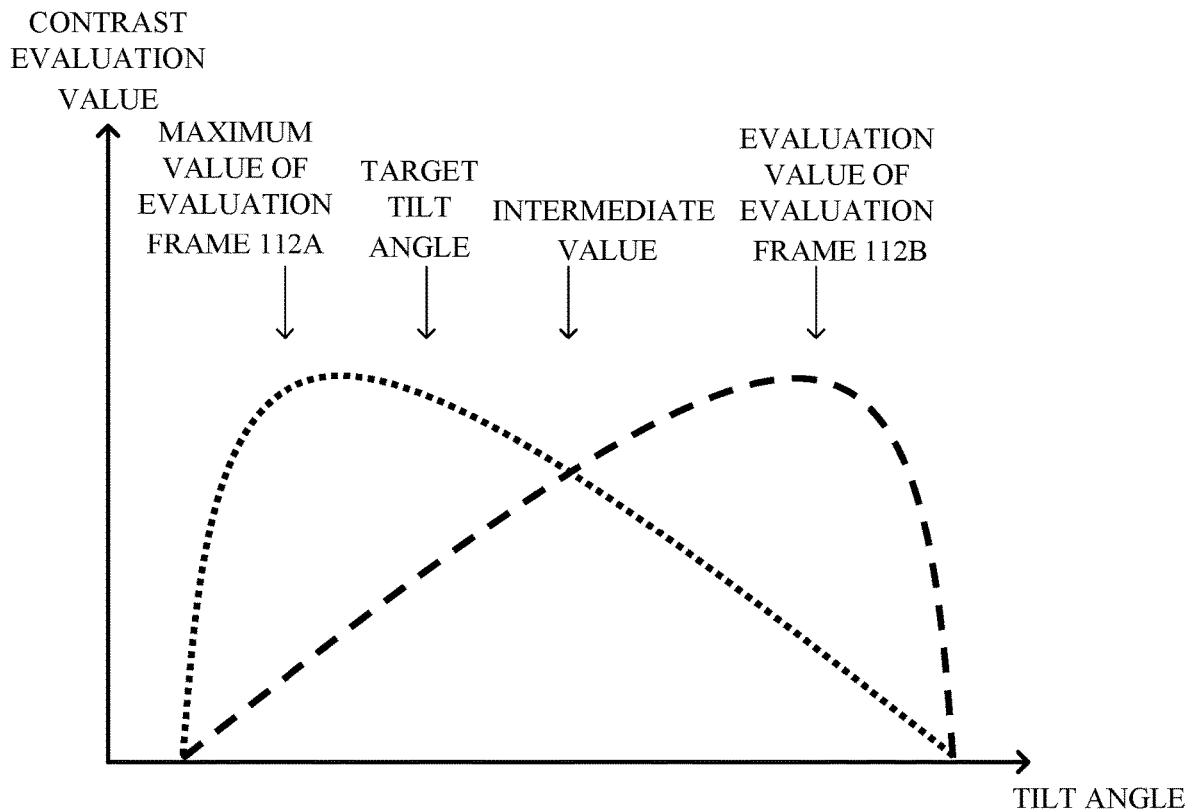
FIG. 12 illustrates a relationship between a tilt angle and a contrast evaluation value according to the fourth embodiment.

Referring now to FIGS. 11 and 12, a description will be given of an imaging apparatus according to a fourth embodiment of the present invention. An imaging apparatus 400 according to this embodiment separately performs a focus control and a tilt angle control in the above embodiments and then simultaneously performs them. The basic configuration of the imaging apparatus 400 is the same as that of the imaging apparatus 100 in FIG. 1.

Referring now to FIG. 11, a description will be given of a control method according to this embodiment. FIG. 11 is a flowchart of the control method. Each step in FIG. 11 is mainly executed by the controller 105.

Initially, in the step S41, the controller 105 acquires the contrast evaluation value of the evaluation frame 111 detected by the evaluation value acquirer 110 while driving the focus lens 106 using the focus control mechanism 102. Then, the controller 105 uses the focus control mechanism 102 to move the focus lens 106 to a position that corresponds to the maximum contrast evaluation value (focus control). Next, in the step S42, the controller 105 acquires the contrast evaluation values of the evaluation frames 112A and 112B detected by the evaluation value acquirer 110 while controlling the tilt angle using the tilt control mechanism 104. Then, the controller 105 controls the tilt control mechanism 104 so that the tilt angle corresponds to the maximum contrast evaluation value (tilt angle control). In the step S41 and S42, as in the first to third embodiments, at least one of the imaging condition, the illumination range, and the pixel signal read range from the image sensor 103 is varied. Thereby, the focus control and angle control can be performed in a short time.

Next, in the step S43, the controller 105 determines whether or not the difference (variation amount) in the contrast evaluation values of the evaluation frames 111, 112A, and 112B before and after the steps S41 and S42 are performed is smaller than a second threshold. If the contrast evaluation value difference is equal to or larger than the second threshold, the flow returns to the step S41 and the controller 105 performs the focus control and angle control again. On the other hand, the controller 105 transfers to the step S44, when the difference of the contrast evaluation value is smaller than the second threshold.

In the step S44, the controller 105 acquires all of the contrast evaluation values of the evaluation frames 111, 112A, and 112B from the evaluation value acquirer 110, while simultaneously driving the focus lens (focus control) and controlling the tilt angle (angle control). More specifically, the controller 105 controls the focus control mechanism 102 and the tilt control mechanism 104 so that the average of the contrast evaluation values of the evaluation frames 111, 112A, and 112B becomes maximum. Hence, the controller 105 can perform the focus control and angle control in a short time by acquiring the contrast evaluation value of each evaluation frame while simultaneously driving the focus control mechanism 102 and the tilt control mechanism 104.

This embodiment may change the control of the step S42 based on a change in the contrast evaluation value before and after the single tilt angle adjustment. In other words, when the difference between the contrast evaluation values of the evaluation frame 112B before and after the tilt angle adjustment is large, the controller 105 controls the tilt angle using the contrast evaluation value of the evaluation frame 112B in the step S42. On the other hand, when the difference between the contrast evaluation values of the evaluation frame 112B before and after the single tilt angle adjustment is small, the controller 105 controls the tilt angle using the contrast evaluation value of the evaluation frame 112A in the step S42.

In this embodiment, when the difference is large between the contrast evaluation values before and after the steps S41 and S42 are performed or when the focus position and the tilt angle are away from the object surface, the focus control and angle control are simultaneously performed as in the step S44. The reason will be described below.

When the difference between the focal plane and the object surface is large, there is a large shift between the tilt angle corresponding to the maximum contrast evaluation value of the evaluation frame 112A and the tilt angle corresponding to the maximum contrast evaluation value of the evaluation frame 112B. In addition, there is a large difference between the optimum tilt angle and the intermediate value between the tilt angle corresponding to the maximum contrast evaluation value of the evaluation frame 112A and the tilt angle corresponding to the maximum contrast evaluation value of the evaluation frame 112B. This reason will be described with reference to FIG. 12.

FIG. 12 illustrates a relationship between the tilt angle and the contrast evaluation value, and illustrates the contrast evaluation values of the evaluation frames 112A and 112B when the tilt angle is set. In FIG. 12, the abscissa axis represents the tilt angle, and the ordinate axis represents the contrast evaluation value. As illustrated in FIG. 12, there is a large difference between the tilt angle (target tilt angle) and an intermediate value between the tilt angle (maximum value) corresponding to the maximum contrast evaluation value of the evaluation frame 112A and the tilt angle (maximum value) corresponding to the maximum contrast evaluation value of the evaluation frame 112B.

As described above, when the difference between the focal plane and the object surface is large, the steps S41 and S42 may be repeated so as to independently perform the focus control and angle control. Then, after the difference between the focal plane and the object surface becomes small, the focus control and angle control are simultaneously performed in the step S44. Hence, in this embodiment, the controller 105 determines the difference in contrast evaluation value during the focus control and during the angle control (before and after the single focus position adjustment and tilt angle adjustment). When the difference is smaller than the second threshold, the controller 105 performs the focus control and angle control at the same time. Thereby, the focus control and angle control can be performed in a shorter time.

Fifth Embodiment

Figure 13:
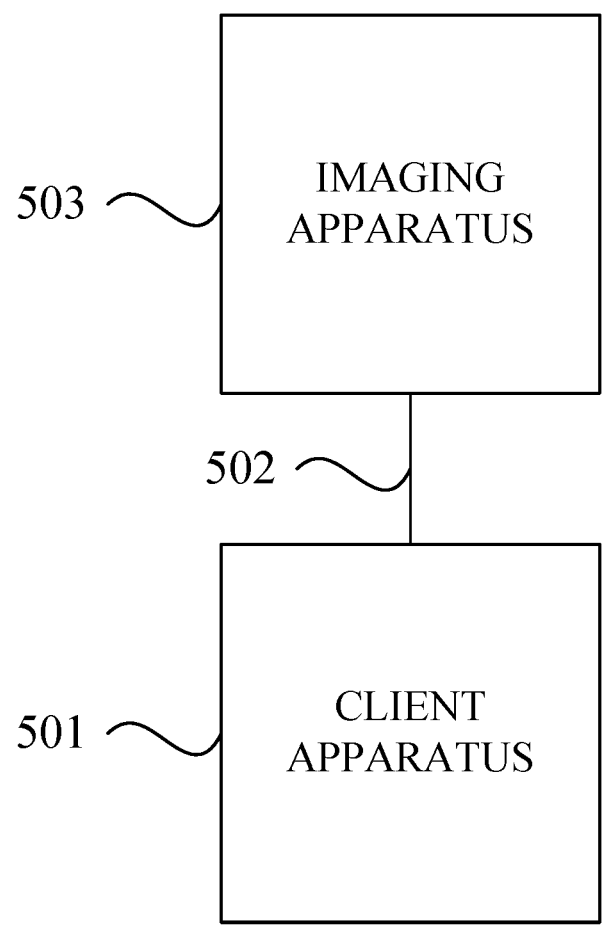
FIG. 13 is a block diagram of a monitoring system according to a fifth embodiment.

Referring now to FIG. 13, a description will be given of a monitoring system according to a fifth embodiment of the present invention. FIG. 13 is a block diagram of a monitoring system 500 according to this embodiment. The monitoring system 500 includes a client apparatus 501 and an imaging apparatus 503. The imaging apparatus 503 corresponds to any of the imaging devices 100 to 400 according to the first to fourth embodiments described above.

The client apparatus 501 and the imaging apparatus 503 are connected to each other via a network 502 so that they can communicate with each other. The client apparatus 501 transmits a variety of commands for controlling the imaging apparatus 503, to the imaging apparatus 503. The imaging apparatus 503 receives the command from the client apparatus 501, and transmits a response corresponding to the command and captured image data to the client apparatus 501. The user can select whether to drive the imaging apparatus 503 in a desired mode such as a depth-of-field priority mode via the client apparatus 501. The client apparatus 501 is an external device such as a PC. The network 502 is configured by a wired LAN, a wireless LAN, or the like. In this embodiment, the power may be supplied to the imaging apparatus 503 via the network 502.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can execute the focus control and angle control in a short time, when the positional relationship shifts between the object surface and the focal plane during the tilt imaging. Therefore, each embodiment can provide an imaging apparatus and a monitoring system, each of which can perform the focus control and angle control in a short time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-201739, filed on Oct. 26, 2018, which is hereby incorporated by reference herein in its entirety.

What is claimed is:

1. An imaging apparatus comprising:
    an image sensor;
    a hardware processor; and
    a memory for storing instructions to be executed by the hardware processor, wherein, when the instructions stored in the memory are executed by the hardware processor, the imaging apparatus functions as:
        a focus controlling unit configured to control a focus position of an imaging optical system;
        an angle controlling unit configured to change an angle formed between a plane orthogonal to an optical axis of the imaging optical system and an imaging plane of the image sensor;
        an evaluation value acquiring unit configured to acquire a first contrast evaluation value in a first evaluation area of the image sensor during a focus control, and to acquire a second contrast evaluation value in a second evaluation area different from the first evaluation area during an angle control, wherein the first evaluation area is a central area of an effective pixel area of the image sensor, and the second evaluation area is a peripheral area of the effective pixel area of the image sensor; and
        a determining unit configured to determine a first exposure condition during the focus control based on the first contrast evaluation value, and determines a second exposure condition different from the first exposure condition during the angle control based on the second contrast evaluation value, wherein the second evaluation area includes a first partial evaluation area, and a second partial evaluation area that has a second distance from the imaging apparatus to an object surface longer than a first distance from the imaging apparatus to the object surface of the first partial evaluation area, and wherein the determining unit determines a variation amount in the second contrast evaluation value during the angle control, determines the second exposure condition based on a contrast evaluation value of the second partial evaluation area when the variation amount is larger than a first threshold, and determines the second exposure condition based on a contrast evaluation value of the first partial evaluation area when the variation amount is smaller than the first threshold.

2. The imaging apparatus according to claim 1, wherein the determining unit determines the first exposure condition during the focus control using a pixel signal of the first evaluation area, and determines the second exposure condition during the angle control using a pixel signal of the second evaluation area.

3. The imaging apparatus according to claim 1, further comprising:

a first illumination element; and a second illumination element having a second illumination range wider than a first illumination range of the first illumination element, wherein the determining unit makes a second ratio of a current passing through the second illumination element to the current passing through the first illumination element during the angle control larger than a first ratio of the current passing through the second illumination element to the current passing through the first illumination element during the focus control.

4. The imaging apparatus according to claim 3, wherein the determining unit uses the first illumination element for the focus control and the second illumination element for the angle control.

5. The imaging apparatus according to claim 3, further comprising:

a third illumination element configured to illuminate an area corresponding to the first evaluation area; and a fourth illumination element and a fifth illumination element each configured to illuminate an area corresponding to the second evaluation area, wherein the determining unit makes a third ratio of a current passing through the third illumination element to an average value of a current passing through the fourth illumination element and a current passing through the fifth illumination element during the focus control larger than a fourth ratio of the current passing through the third illumination element to the average value of the current passing through the fourth illumination element and the current passing through the fifth illumination element during the angle control.

6. The imaging apparatus according to claim 5, wherein the determining unit makes an illumination intensity of the fifth illumination element configured to illuminate the second partial evaluation area larger than an illumination intensity of the fourth illumination element configured to illuminate the first partial evaluation area during the angle control.

7. The imaging apparatus according to claim 1, wherein the determining unit determines another variation amount in the second contrast evaluation value during the focus control and during the angle control, and simultaneously performs the focus control and the angle control when the another variation amount is smaller than a second threshold.

8. A monitoring system comprising the imaging apparatus according to claim 1.

9. A control method of an imaging apparatus including an image sensor; a hardware processor; and a memory for storing instructions to be executed by the hardware processor, wherein, when the instructions stored in the memory are executed by the hardware processor, the imaging apparatus functions as: a focus controlling unit configured to control a focus position of an imaging optical system; and an angle controlling unit configured to change an angle formed between a plane orthogonal to an optical axis of the imaging optical system and an imaging plane of the image sensor, the control method comprising:

acquiring a first contrast evaluation value in a first evaluation area of the image sensor during a focus control wherein the first evaluation area is a central area of an effective pixel area of the image sensor;

acquiring a second contrast evaluation value in a second evaluation area different from the first evaluation area during an angle control wherein the second evaluation area is a peripheral area of the effective pixel area of the image sensor; and determining an exposure condition of the image sensor, wherein in the determining the exposure condition, a first exposure condition is determined during the focus control based on the first contrast evaluation value, and a second exposure condition different from the first exposure condition is determined during the angle control based on the second contrast evaluation value, wherein the second evaluation area includes a first partial evaluation area, and a second partial evaluation area that has a second distance from the imaging apparatus to an object surface longer than a first distance from the imaging apparatus to the object surface of the first partial evaluation area, and wherein in the determining the exposure condition, a variation amount in the second contrast evaluation value during the angle control is determined, the second exposure condition is determined based on a contrast evaluation value of the second partial evaluation area when the variation amount is larger than a first threshold, and the second exposure condition is determined based on a contrast evaluation value of the first partial evaluation area when the variation amount is smaller than the first threshold.

10. A non-transitory computer-readable storage medium storing a program for causing a computer to execute a control method of an imaging apparatus including an image sensor; a hardware processor; and a memory for storing instructions to be executed by the hardware processor, wherein, when the instructions stored in the memory are executed by the hardware processor, the imaging apparatus functions as: a focus controlling unit configured to control a focus position of an imaging optical system; and an angle controlling unit configured to change an angle formed between a plane orthogonal to an optical axis of the imaging optical system and an imaging plane of the image sensor, wherein the control method comprises:

acquiring a first contrast evaluation value in a first evaluation area of the image sensor during a focus control wherein the first evaluation area is a central area of an effective pixel area of the image sensor;

acquiring a second contrast evaluation value in a second evaluation area different from the first evaluation area during an angle control wherein the second evaluation area is a peripheral area of the effective pixel area of the image sensor; and determining an exposure condition of the image sensor, wherein in the determining the exposure condition, a first exposure condition is determined during the focus control based on the first contrast evaluation value, and a second exposure condition different from the first exposure condition is determined during the angle control based on the second contrast evaluation value, wherein the second evaluation area includes a first partial evaluation area, and a second partial evaluation area that has a second distance from the imaging apparatus to an object surface longer than a first distance from the imaging apparatus to the object surface of the first partial evaluation area, and wherein in the determining the exposure condition,
- a variation amount in the second contrast evaluation value during the angle control is determined,
- the second exposure condition is determined based on a contrast evaluation value of the second partial evaluation area when the variation amount is larger than a first threshold, and
- the second exposure condition is determined based on a contrast evaluation value of the first partial evaluation area when the variation amount is smaller than the first threshold.

11. An imaging apparatus comprising:

an image sensor;

a hardware processor; and a memory for storing instructions to be executed by the hardware processor, wherein, when the instructions stored in the memory are executed by the hardware processor, the imaging apparatus functions as:
- a focus controlling unit configured to control a focus position of an imaging optical system;
- an angle controlling unit configured to change an angle formed between a plane orthogonal to an optical axis of the imaging optical system and an imaging plane of the image sensor;
- an evaluation value acquiring unit configured to acquire a first contrast evaluation value in a first evaluation area of the image sensor during a focus control, and to acquire a second contrast evaluation value in a second evaluation area different from the first evaluation area during an angle control, wherein the first evaluation area is a central area of an effective pixel area of the image sensor, and the second evaluation area is a peripheral area of the effective pixel area of the image sensor; and
- a determining unit configured to determine a first exposure condition during the focus control based on the first contrast evaluation value, and determines a second exposure condition different from the first exposure condition during the angle control based on the second contrast evaluation value, wherein the second evaluation area includes a first partial evaluation area, and a second partial evaluation area that has a second distance from the imaging apparatus to an object surface longer than a first distance from the imaging apparatus to the object surface of the first partial evaluation area, and wherein the determining unit
- determines a variation amount in the second contrast evaluation value during the angle control,
- makes a second weighting coefficient of the second contrast evaluation value for the second partial evaluation area larger than a first weighting coefficient of the first contrast evaluation value for the first partial evaluation area when the variation amount is larger than a first threshold, and
- makes the first weighting coefficient of the first contrast evaluation for the first partial evaluation area larger than the second weighting coefficient of the second contrast evaluation for the second partial evaluation area when the variation amount is smaller than the first threshold.

12. An imaging apparatus comprising:

an image sensor;

a hardware processor; and a memory for storing instructions to be executed by the hardware processor, wherein, when the instructions stored in the memory are executed by the hardware processor, the imaging apparatus functions as:
- a focus controlling unit configured to control a focus position of an imaging optical system;
- an angle controlling unit configured to change an angle formed between a plane orthogonal to an optical axis of the imaging optical system and an imaging plane of the image sensor;
- an evaluation value acquiring unit configured to acquire a first contrast evaluation value in a first evaluation area of the image sensor during a focus control, and to acquire a second contrast evaluation value in a second evaluation area different from the first evaluation area during an angle control, wherein the first evaluation area is a central area of an effective pixel area of the image sensor, and the second evaluation area is a peripheral area of the effective pixel area of the image sensor; and
- a determining unit configured to determine a first exposure condition during the focus control based on the first contrast evaluation value, and determines a second exposure condition different from the first exposure condition during the angle control based on the second contrast evaluation value, wherein the second evaluation area includes a first partial evaluation area, and a second partial evaluation area that has a second distance from the imaging apparatus to an object surface longer than a first distance from the imaging apparatus to the object surface of the first partial evaluation area, and wherein the determining unit
- determines a variation amount in the second contrast evaluation value during the angle control,
- determines the second exposure condition based on a pixel signal of the second partial evaluation area when the variation amount is larger than a first threshold, and
- determines the second exposure condition based on a pixel signal of the first partial evaluation area when the variation amount is smaller than the first threshold.

\* \* \* \* \*